United States Patent [19]
Marciniak et al.

[11] 3,891,599
[45] June 24, 1975

[54] FIRE RETARDANT POLYMER COMPOSITIONS

[75] Inventors: Harry W. Marciniak, Tonawanda; Richard D. Carlson, Grand Island, both of N.Y.; James L. Dever, Bedford, Ohio

[73] Assignee: Hooker Chemicals & Plastics Corporation, Niagara Falls, N.Y.

[22] Filed: Nov. 14, 1973

[21] Appl. No.: 415,915

Related U.S. Application Data

[63] Continuation-in-part of Ser. No. 199,035, Nov. 15, 1971, abandoned, which is a continuation-in-part of Ser. No. 65,663, Aug. 20, 1970, abandoned, which is a continuation-in-part of Ser. No. 51,008, June 29, 1970, abandoned.

[52] U.S. Cl. ......... 260/45.7 R; 106/15 FP; 106/190; 106/195; 106/196; 106/197 R; 260/814
[51] Int. Cl. .............................................. C08d 7/10
[58] Field of Search ........ 260/45.7 R, 45.75 B, 814; 106/15 FP, 190, 195, 196, 197 R

[56] References Cited
UNITED STATES PATENTS

| | | | |
|---|---|---|---|
| 2,028,715 | 1/1936 | Hanson | 252/8.1 |
| 2,290,759 | 7/1942 | Levine et al. | 260/650 |
| 2,569,131 | 9/1951 | Markarian | 260/87.5 |
| 2,760,947 | 8/1956 | Werkema et al. | 260/33.8 |
| 2,952,712 | 9/1960 | Roberts et al. | 260/650 |
| 2,967,842 | 1/1961 | Roberts | 260/33.8 |
| 3,403,036 | 9/1968 | Hindersinn et al. | 260/45.75 |
| 3,474,067 | 10/1969 | Praetzel et al. | 260/41 |
| 3,489,814 | 1/1970 | Pews et al. | 260/611 |
| 3,560,580 | 2/1971 | Burk | 260/650 |

*Primary Examiner*—Melvyn I. Marquis
*Attorney, Agent, or Firm*—Peter F. Casella; James F. Mudd

[57] ABSTRACT

New fire retardant polymer compositions comprise a polymer and an effective fire retardant proportion of the compound of the formula:

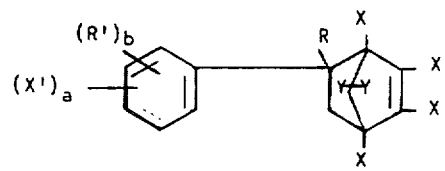

wherein X is halogen selected from the group consisting of fluorine, chlorine and bromine and mixtures thereof; Y is a substituent selected from the group consisting of fluorine, chlorine, bromine, alkyl of 1 to 10 carbon atoms, halogen substituted alkyl of 1 to 10 carbon atoms, alkoxy of 1 to 10 carbon atoms, and halogen substituted alkoxy of 1 to 10 carbon atoms, X' is a halogen independently selected from the group consisting of chlorine, bromine and mixtures thereof; R and R' are independently selected from the group consisting of hydrogen, alkyl of 1 to 6 carbon atoms and halogen substituted alkyl of 1 to 6 carbon atoms wherein said halogen is selected from the group consisting of fluorine, chlorine and bromine; $a$ is about 4 to 5; $b$ is 0 to about 1; and $a$ plus $b$ is 5.

27 Claims, No Drawings

FIRE RETARDANT POLYMER COMPOSITIONS

REFERENCE TO PRIOR APPLICATIONS

This is a continuation-in-part of copending application Ser. No. 199,035, filed Nov. 15, 1971, now abandoned, which is a continuation-in-part of copending application Ser. No. 65,663, filed Aug. 20, 1970, which is a continuation-in-part of copending Ser. No. 51,008, filed June 29, 1970, both of which are now abandoned.

BACKGROUND OF THE INVENTION

1. Field of the Invention

In a number of applications the combustability of most organic polymers is an obstacle to their use. Areas in which fire resistance must be assured are the building industry, the mining industry and the electrical industry.

2. Description of the Prior Art

Many attempts have been made to render ordinarily combustible plastics fire retardant. Chlorinated hydrocarbons together with antimony trioxide have been used as fire retardant additives. Such mixtures have a tendency towards thermal decomposition reactions at high manufacturing temperatures usually used in molding the plastic and this has an adverse effect on the mechanical qualities of the finished product.

Other flameproofing agents are used such as aromatic or aromatic aliphatic ethers which are chlorinated or brominated on the aromatic nucleus or anilines brominated on the aromatic nucleus which in combination with antimony trioxide and used especially with polyolefins tend to sweat out on storage forming efflorescences on the self-extinguishing molding compounds manufactured therewith.

SUMMARY OF THE INVENTION

It is an object of this invention to provide novel fire retardant compositions of organic polymers such that the desirable physical properties of the organic polymers are not adversely affected by the additives used to provide non-flammability and such that the fire retardant additives are compatable with the organic polymers or otherwise non-migratory, so that migration of the flameproofing agents to the surface of the polymer upon storage is reduced or eliminated. In accordance with and fulfilling these objects, one aspect of this invention resides in the use as a fire retardant in connection with organic polymers of a compound of the formula:

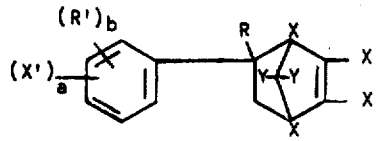

wherein X is halogen selected from the group consisting of fluorine, chlorine, bromine and mixtures thereof; Y is a substituent selected from the group consisting of fluorine, chlorine, bromine, alkyl of 1 to 10 carbon atoms, halogen-substituted alkyl of 1 to 10 carbon atoms, alkoxy of 1 to 10 carbon atoms, and halogen substituted alkoxy of 1 to 10 carbon atoms. X' is a halogen independently selected from the group consisting of chlorine and bromine; R and R' are independently selected from the group consisting of hydrogen, alkyl of 1 to 6 carbon atoms and halogen substituted alkyl of 1 to 6 carbon atoms wherein said halogen is selected from the group consisting of fluorine, chlorine and bromine; $a$ is about 4 to 5; $b$ is 0 to about 1; and $a$ plus $b$ is 5.

The new compounds are useful as fire retardant and flameproofing agents, particularly for plastics such as polyethylene, polypropylene or terpolymers of polybutadiene with acrylonitrile and styrene.

DESCRIPTION OF THE EMBODIMENTS

The starting materials for the preparation of the fire retardant additive compounds are preferably pure or substantially pure materials, that is of the commercial grade, although mixtures with other reactive compounds or with inert diluents or isomers of the compounds can be used.

Halogenated cyclopentadiene adducts of styrene can be prepared by reacting (1) a styrene derivative of the following structure

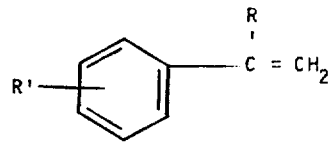

wherein R and R' are as described hereinbefore, with a halogenated cyclopentadiene of the structure

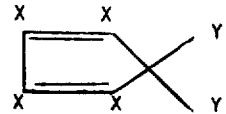

wherein X and Y are as described hereinbefore and (2) halogenating the resulting adduct to produce an average of about 4 halogen atoms on the benzene ring. Preferably, the number of carbon atoms in each of the above substituents is from 1 to 6 carbon atoms.

The molar ratio employed in Step 1 ranges from about 0.5 moles to approximately 5 moles of halogenated cyclopentadiene per mole of styrene preferably about 0.5 to about 2 moles and even more preferably the reactants are employed on an equal molecular ratio. The temperature of the first step, that is the Diels-Alder addition, ranges from about 50° to about 250° centigrade, preferably, about 100° to about 180° centigrade and even more preferably from about 140° to about 170° centigrade. The halogenation temperature ranges from about −50° to about 150° centigrade, preferably from about 10° to about 110° centigrade.

In the halogenation reaction, catalysts can be employed such as powdered iron, iron halides such as ferric chloride or ferric bromide, aluminum, aluminum halides such as aluminum chloride or bromide zinc, zinc halides such as zinc chloride or zinc bromide. Other catalysts that may be employed are antimony and molybdenum metals and their halides. The amount of halogenation catalyst employed on a weight percentage basis of the amount of adduct reactant ranges from about 0.01 to about 10.0.

The first reaction may be carried out in the absence of solvents. However, solvents inert to reactants and products may be used, such as perchloroethylene, trichloroethylene, cyclohexane, etc. Solvents that may be employed in the halogenation step are solvents inert to the reactants and the reaction products. Such solvents are halogenated aliphatics such as acetylene tetrachloride, trichloromethane, hexachlorobutadiene, methylene chloride, chloroform and carbon tetrachloride, etc.

The chlorination agent preferably is chlorine. However, other compounds which will emit chlorine may be employed, such as $SCl_2$, $S_2Cl_2$, $SO_2Cl_2$, $PCl_5$, etc.

The preferred bromination reagent is a mixture of $Br_2$ and $Cl_2$. However other compounds which will emit bromide, such as, $SBr_2$, $S_2Br_2$, $Br_2$, $SO_2Br_2$, $PBr_5$, etc. can also be used. When employing a mixture of bromine and chlorine as the bromination reagent the molar ratios used are from about 0.5 to about 2 moles bromine per mole of chlorine, preferably equimolar and even more preferably an excess of chlorine, i.e., about 0.8 moles of bromine per mole of chlorine.

The length of time for the Diels-Alder reaction is from about 2 to about 48 hours preferably from about 6 to about 40 hours. The length of time for the halogenation reaction is from about 2 to about 15 hours, preferably from about 3 to about 10 hours.

Halogenated cyclopentadiene adducts of styrene can also be prepared by reacting a halogenated styrene derivative with a halogenated cyclopentadiene. These adducts are prepared by utilizing a compound of the structure:

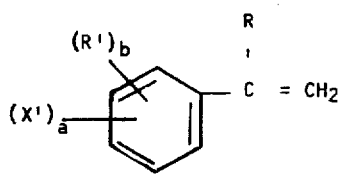

wherein X', R, R', a and b are as identified hereinbefore. The preferred compound is when R and R' are hydrogen. Another preferred compound is when R is methyl. The above styrene or derivative is reacted with a halogenated cyclopentadiene such as described hereinbefore.

The preparation of the additives of the invention is further described in U.S. Pat. No. 3,711,563, issued Jan. 16, 1973, hereby incorporated by reference.

The adducts as described are suitable for reducing the inflammability of most high polymerized materials. Their use is especially effective in materials which have been produced by the polymerization of unsaturated compounds, especially of olefins such as ethylene, propylene, and styrene, and copolymers thereof. The additives are also useful in combination with terpolymers of butadiene with acrylonitrile and styrene and cross-linkable butadiene-styrene polymers. In addition, natural and synthetic rubber compounds can be rendered effectively flameproof in this manner.

The molding compounds rendered flameproof according to the invention can contain conventional additives customarily used in polymer chemistry such as plasticizers, lubricants, fillers, heat and light stabilizers etc. If desired, the fire retardant agents to be used according to the invention can be combined with other fire retardant agents such as chloroparaffins.

The additives used according to the invention have, in comparison with chlorinated aliphatic hydrocarbons and organic acid esters of halogenated phenols and other such substances, the advantage of improved temperature stability so that HCl evolution is reduced during processing of the plastic. Therefore, improvements can be expected in this regard when the substances of the invention are used as compared to chlorinated aliphatic hydrocarbons even when the manufacturing is done at a relatively high temperature.

The polymeric compositions and coatings of this invention include high molecular weight thermosetting and thermoplastic polymers and resins as well as the intermediate molecular weight materials utilized for coatings and paints. The polymers embraced within the scope of this invention include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene or with other olefins, polybutadiene; polymers of butadiene, polyisoprene, both natural and synthetic, polystyrene including high impact polystyrene, and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyhalogenated hydrocarbon polymers, including fluoro polymers such as polytetrafluoroethylene; polysilicon and polyhalogenated silicons; polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyl resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins, furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo resins; phenolic resins such as phenol-formaldehyde, phenolic-elastomer, phenolicepoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymers chain; polyacryl amides; polysulfones; polyester resins such as unsaturated polyesters of dibasic acids and dihydroxy compounds, and polyester elastomers and resorcinol resins such as resorcinol-formaldehyde, resorcinol-furfural, resorcinol-phenol-formaldehyde, resorcinol-polyamide and resorcinol-urea: rubbers such as natural rubber, silicone rubber, synthetic polyisoprene, reclaimed rubber, chlorinated rubber, polybutadiene, cyclized rubber, butadiene-acrylonitrile rubber, butadiene-styrene rubber, styrene-butadiene block copolymer rubber, butyl rubber, polysulfide rubber, urethane rubber, acrylic rubber, ethylene-propylene-diene-modified rubber, neoprene rubber (polychloroprene); polysulfides (Thiokol); terpene resins, urea resins; vinyl resins such as polymers of vinyl acetal, vinyl acetate or vinyl alcohol-acetate copolymers, vinyl alcohol, vinyl chloride, vinyl butyral, vinyl chloride-acetate copolymer, vinyl pyrrolidone and vinylidene chloride copolymer; polyformaldehyde; polyethers, such as polyphenylene oxide, polymers of diallyl phthalates and phthalates; polycarbonates of phosgene or thiophosgene and dihydroxy compounds such as bisphenols, thermoplastic polymers of bisphenols and epichlorohydrin (tradename Phenoxy polymers); graft copolymers and polymers of unsaturated hydrocarbons and an unsaturated monomer, such as graft copolymers or polybutadiene, styrene and acrylonitrile, commonly called ABS resins; copolymers or mixtures of polybutadiene and styrene known as high impact polystyrene; ABS-polyvinyl chloride polymers; acrylic polyvinyl chloride polymers; and any other suitable natural and synthetic polymers.

The polymers of the invention can be in various physical forms such as shaped articles, for example, moldings, sheets, rods, and the like; fibers, coatings, films and fabrics, and the like.

The halogenated Diels-Alder adducts in the present compositions are desirably incorporated in the polymeric materials in an effective fire retardant amount. Generally, the halogenated Diels-Alder adducts are employed in a proportion of up to about 50 percent by weight of the polymer composition and desirably from about 5 to about 40 percent by weight of the polymer composition and preferably from about 10 to 35 percent by weight of the polymer composition. Improved fire retardance can be provided by incorporating metallic compounds, wherein the metal is selected from the group consisting of antimony, lead, tin, arsenic, and bismuth, in the polymeric compositions in the amount of about 1 to about 30 percent by weight of said polymeric composition, preferably about 2 to 25 percent. Generally the ratio of the halogenated Diels-Alder adduct to the metallic compound is in the range of 3:1 to 4:1. In the case of the use of the halogenated Diels-Alder adduct with silicone rubber in amounts over 10 percent by weight based on 100 parts of rubber, the use of a metallic compound is not essential to achieve suitable fire retardancy.

Antimony oxide is the antimony compound that is presently preferred to use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony perlargonate, antimony caprate, antimony cinnamate, antimony anisate, and their pentavalent dihalide derivatives. Likewise, the esters of antimonius acids and their pentavalent derivatives disclosed in U.S. Pat. No. 2,993,924 such as tris (n-octyl) antimonite, tris (2-ethylhexyl) antimonite, tribenzyl antimonite, tris(beta-chloroethyl) antimonite, tris (beta-chloropropyl) antimonite, tris(beta-chlorobutyl)antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth. Lead arsenate and stannous oxide are also effective in compositions of the invention.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer, e.g., from 70° to 600° centigrade. Alternatively, the additives and polymer are dry-blended in the finely-divided state so that an intimate mixture is obtained upon subsequent molding or extrusion.

The invention is illustrated by the following examples, which are not intended to limit the scope of the invention. Unless otherwise stated, all parts are by weight and all temperatures in degrees centigrade. In these examples the properties of the molded polymer compositions were tested in accordance with standard American Society for Testing Materials (ASTM) test procedure ASTM D 635-56T unless otherwise noted. In this test, a specimen can fall into one of three categories: (1) Burning (the rate is reported), (2) Self-extinguishing upon removal of flame and (3) Non-burning. In these examples, the length of time the specimens burned after the flame was removed is reported. Usually a range for several specimens is given.

EXAMPLE 1

Seventy parts of polyethylene, 22 parts of a flame retardant agent consisting of a mixture of 80 percent of the formula:

where $a$ is an average of about 4, and 20 percent of the formula:

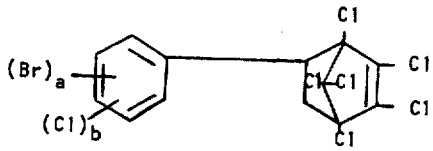

where $a$ is an average of about 3 and where $b$ is an average of about 1, were combined with 8 parts of antimony trioxide and dry blended. This was followed by an extrusion melt blending process in a Brabender extruder. The extrudate was then air cooled and pelletized for injection molding using a one ounce plunger type injection molder to produce bar moldings of the following dimensions: 5 × ½ × 150 inches. The average on the flammability test during which time the specimens burned was 1.2 seconds with an afterglow of 1 second.

An alternate method of evaluating the flammability was the UL-94 test method which showed a first self-extinguishing (burning) time of 1.2 seconds and a second self-extinguishing time plus afterglow of 17.6 seconds for a total of 18.8 seconds which is passing on the test. Polyethylene burns following the test procedures when no additive is present.

EXAMPLE 2

Seventy of polypropylene, 22 parts of the flame retardant agent of Example 1 were combined with 8 parts of antimony trioxide and mixed and extruded using the same procedure as in Example 1. On the ASTM D-635 test method for flammability the self-extinguishing (burning) time was 2.9 seconds and the afterglow was 60 seconds. Using the UL-94 test method for flammability the first flameout plus afterglow was greater than 18.8 seconds and the second flameout plus afterglow was greater than 66.2 seconds which results in a failure on the test. Uncompounded polypropylene burns under the conditions of the test.

EXAMPLE 3

Eighty parts of polystyrene and 15 parts of the fire retardant agent of Example 1 were mixed with 5 parts of antimony trioxide and mixed and injection molded in accordance with the procedure in Example 1. Flammability tests by the ASTM-D-635 test procedure showed a self-extinguishing time of 7.9 seconds with an afterglow of 6 seconds. Using the alternate flammability test method of UL-94, first flameout plus afterglow was 1.5 seconds. The second flameout plus afterglow was 4.7 seconds resulting in a total of 6.2 seconds and a passing score on the test. Polystyrene burns uncompounded.

EXAMPLE 4

Eighty-three parts of a terpolymer ("Blendex 101" made by Marbon Chemical Division of Borg-Warner) of polybutadiene with acrylonitrile and styrene was blended with 13 parts of the fire retardant agent of Example 1 and 4 parts of antimony trioxide and mixed and extruded by the methods described in Example 1. Flammability tests on the resultant moldings according to the ASTM D-635 test method showed a self-extinguishing time of 1.7 seconds with an afterglow of 2.0 seconds. On the alternate UL-94 flammability test method, the first self-extinguishing time was 1.2 seconds for a total of approximately 4.2 seconds with a pass on the test. In this example as indicated in all the previous examples, controls were run without the addition of flame retarding agent or antimony compound and it was found that the plastics were not self-extinguishing and that they would burn for a time greater than 45 seconds.

EXAMPLES 5–8

In order to distinguish between the prior art wherein an adduct of dichlorostyrene and hexachlorocyclopentadiene is used as a fire retarding additive, compositions of the dichlorostyrene adduct, forming no part of this invention, were made up following the methods described in Example 1 together with antimony trioxide and compared with compositions incorporating the post-tetrachlorinated adduct of styrene and hexachlorocyclopentadiene in the same ratios. Results shown in Tables A and B reveal that when compounded in polypropylene, polyethylene, and a terpolymer of polybutadiene and poly(acrylonitrile-styrene) the post-tetrachlorinated adduct of styrene and hexachlorocyclopentadiene is unexpectedly more efficient as a flame retardant than is the dichlorostyrene adduct of hexachlorocyclopentadiene.

Table A (dichlorostyrene hexachlorocyclopentadiene adduct) = additive A

| Type Polymer | PARTS IN COMPOSITION | | | ASTM D-635 FLAMMABILITY | |
|---|---|---|---|---|---|
| | Polymer | Additive A | Antimony Trioxide | Self. Ext. | After Glow Seconds |
| Polypropylene | 65 | 25 | 10 | 12.0 | >45 |
| Low density polyethylene | 65 | 25 | 10 | 16.5 | 6.7 |
| Terpolymer of polybutadiene with acrylonitrile and styrene | 78 | 17 | 5 | 17.3 | 7.3 |
| Polystyrene | 80 | 15 | 5 | 8.0 | 10.0 |

TABLE B (tetrachlorinated styrene hexachloropentadiene adduct) = additive B

| Example | Type Polymer | PARTS IN COMPOSITION | | | ASTM D-635 FLAMMABILITY | |
|---|---|---|---|---|---|---|
| | | Polymer | Additive B | Antimony Trioxide | Self. Ext. | After Glow Seconds |
| 5 | Polypropylene | 65 | 25 | 10 | 2.3 | 40 |
| 6 | Low density polyethylene | 65 | 25 | 10 | 2.9 | 0 |
| 7 | Terpolymer of polybutadiene with acrylonitrile and styrene | 78 | 17 | 5 | 4.0 | 6.3 |
| 8 | polystyrene | 80 | 15 | 5 | 7.5 | 13.0 |

EXAMPLE 9

One hundred parts of a styrene-butadiene rubber (Ameripol-1500 Manufactured by B. F. Goodrich Company) and 6.7 parts of antimony trioxide were mixed with 20 parts of the flame retardant of Example 1 using a heated two roll mill to blend until a homogeneous sheet was produced. A composition molded from this mixture was tested for fire retardance by ASTM D-635 Test Method. A flameout time of 2.7 seconds was obtained. A control containing no flame retardants but otherwise the same in composition was not self-extinguishing by this test method.

EXAMPLE 10

In a like manner (Example 9) 100 parts of a butyl rubber (Enjay 218 made by Enjay Co.) 15 parts of antimony trioxide and 30 parts of the flame retardant of Example 1 were mixed together on a heated two-roll mill until a homogenous sheet was produced. A composition molded from this material and test according to ASTM D-635 provided a flameout time of 11 seconds. A control not containing flame retardants but equivalent in composition otherwise to the above was not self-extinguishing by this test method.

EXAMPLE 11

One hundred parts of a general purpose polyester resin of the orthophthalic type was made be reacting propylene glycol, phthalic anhydride, and maleic anhydride and dissolving in styrene monomer, 15 parts of antimony trioxide and 30 parts of the flame retardant of Example 1 were well mixed using a mortar and pestle. Moldings were made and cured for 16 hours at 50°C. and additionally 24 hours at 120°C. Evaluation using the ASTM D-635 Test Method showed a flameout time of 1 second and an ASTM D-757 burning rate of 0.38 inches per minute. A control sample containing no fire retardant additives were cured in the same way as above and was found to be not self-extinguishing by ASTM D-635 Test Method and showed a burning rate when evaluated according to ASTM D-757 of 0.96 inches per minute.

EXAMPLE 12

One hundred parts of an epoxy resin (Araldite 6020 made by the Ciba Corporation) 15 parts of antimony trioxide and 30 parts of the flame retardant Example 1 were mixed with 12 parts of diethylene triamine curing agent using a mortar and pestle. Moldings were cured 16 hours at 120°C. and ASTM D-635 flameout time of 1 second was obtained and a burning rate of 0.47 inches per minutes was attained upon evaluation by ASTM D-757 Test Method. A control sample cured in the same way containing no flame retardant additives was not self-extinguishing by ASTM D-635 and possessed a burning rate according to ASTM D-757 of 0.78 inches per minute.

EXAMPLE 13

Eighty-three parts of a terpolymer ("Blendex 101" made by the Marbon Chemical Division of Borg-Warner) of polybutadiene with acrylonitrile and styrene was blended with 13 parts of the adduct of tribromostryene hexachlorocyclopentadiene together with four parts of antimony trioxide and mixed and extruded by the methods described in Example 1. Flammability tests on the resulting molding according to ASTM D-635 Test Method showed a self-extinguishing time of 10.7 seconds and an afterglow of 6.5 seconds. In this example as indicated in previous examples, controls were run without the addition of flame retarding agent or antimony compound and it was found that the composition was not self-extinguishing and burned for a time greater than 45 seconds.

EXAMPLES 14-16

As shown in Table C, various percentages of the pentabromostyrene hexachlorocyclopentadiene adduct were blended with antimony trioxide and a terpolymer of polybutadiene with acrylonitrile and styrene and the moldings subsequently made were tested by the ASTM D-635 Test Method for flammability.

TABLE C (pentabromostyrene hexachlorocyclopentadiene adduct) = additive C

| | | PARTS IN COMPOSITION | | | ASTM D-635 FLAMMABILITY | |
|---|---|---|---|---|---|---|
| Example | Type Polymer | Polymer | Additive C | Antimony Trioxide | Self. Ext. | After Glow Seconds |
| 14 | Terpolymer of polybutadiene with acrylonitrile and styrene | 87 | 10 | 3 | 19.7 | 7.0 |
| 15 | same | 83 | 13 | 4 | 5.6 | 0 |
| 16 | same | 80 | 15 | 5 | 0 | 0 |

EXAMPLES 17-19

As shown in Table D below, various percentages of the tetrabromostyrene hexachlorocyclopentadiene adduct were blended with a terpolymer of polybutadiene with acrylonitrile and styrene and the moldings subsequently made were tested by the ASTM D-635 test method for flammability. The results show that even without the synergistic effect contributed by a compound such as antimony oxide, a degree of fire retardance can be obtained by the incorporation of 20 parts of the tetrabromostyrene hexachlorocyclopentadiene adduct.

TABLE D (tetrabrominated hexachlorocyclopentadiene adduct=additive D)

| | PARTS IN COMPOSITION | | ASTM D-635 FLAMMABILITY | |
|---|---|---|---|---|
| Example | Type Polymer | Additive D | Self Ext. | After Glow Seconds |
| 17 | terpolymer of polybutadiene with acrylonitrile and styrene | 20 | 37 | 0 |
| 18 | same | 17 | 45 | 0 |
| 19 | same | 15 | 45 | 0 |

EXAMPLE 20

Eighty parts by weight of a diallyl phthalate molding powder (Dapon 35 made by F. M. C. Corporation) were combined with 16 parts of the flame retardant of Example 1 and 4 arts of antimony trioxide and mixed by ball milling for one-half hour. Thirty-five parts by weight of fibrous glass ⅛ inch fiber length were added to the compound and the mixture ball milled for an additional one-half hour. The compound was then molded and cured at 340°F. for 3 minutes. The molded samples were evaluated for fire retardance by the ASTM D-757 test method and found to have a burning rate of 0.42 inches per minute. A control sample with no fire retardant additives had a burning rate of 0.59 inches per minute when evaluated by the same test procedure.

Some of the halogenated cyclopentadienes that may be employed are as follows: hexachlorocyclopentadienes, such as hexachlorocyclopentadiene, hexafluorocyclopentadiene, hexabromocyclopentadiene, pentachloromonobromocyclopentadiene, tetrachlorodibromocyclopentadiene, etc; monoalkyl pentahalocyclopentadienes, such as methylpentachlorocyclopentadiene; methylpentabromocyclopentadiene; dialkyltetrahalocyclopentadienes, such as dimethyltetrachlorocyclopentadiene, dimethyltetrabromocyclopentadiene.

Some of the halogen substituted alkyl cyclopentadienes are:

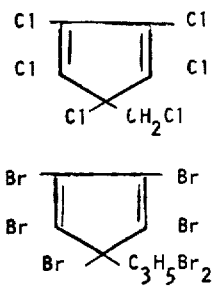
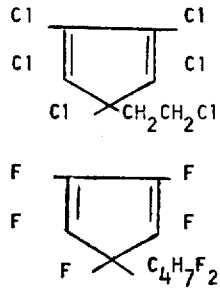
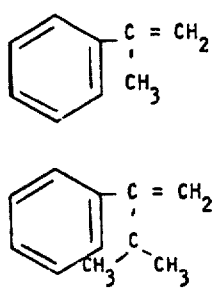
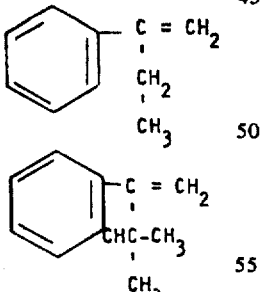

Some of the styrene compounds that may be employed are styrene, or

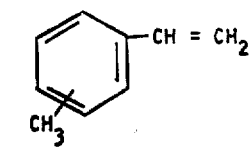
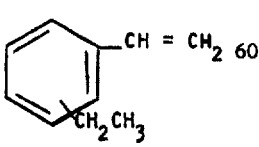
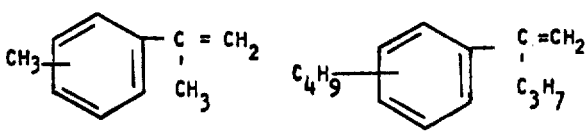

Some preferred novel compounds resulting from the process can be depicted as follows:

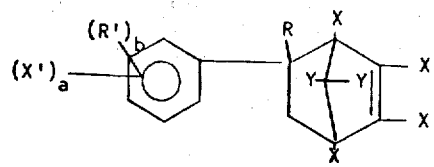

| | R | R' | X | X' | Y | a |
|---|---|---|---|---|---|---|
| 1. | H | H | Cl | Cl | Cl | 4 |
| 2. | H | H | Cl | Cl | Cl | 5 |
| 3. | H | —CH₃ | Cl | Cl | Cl | 4 |
| 4. | —CH₃ | H | Cl | Cl | Cl | 4 |
| 5. | H | | Cl | 4Br & 1Cl* | Cl | 5 |
| 6. | H | H | Cl | Br | Cl | 4 |
| 7. | H | | Cl | 3Br & 2Cl* | Cl | 5 |
| 8. | H | | Cl | Br | Cl | 5 |
| 9. | H | H | Br | Br | Br | 4 |

*=mixture of halogens (bromine and chlorine) on aromatic ring.

EXAMPLES 21-25

Several examples of high impact polystyrene were compared compounded with the fire retardant agent of Example 1 together with varying amounts of antimony trioxide. The samples were mixed and injection molded in accordance with the procedure in Example 1. Flammability tests by the ASTM D-635 test procedure showed the samples to be self-extinguishing as compared to the uncompounded high impact polystyrene controls which burn. High impact polystyrene is a heterophase polymer with a rubbery polymer dispersed as small globules in a continuous matrix of polystyrene. The amount of rubber present by volume may be as low as 10 to 15 percent in medium impact grades and range as high as 40 percent in extra high impact types. The rubbery polymer used with the polystyrene is usually an elastomer with residual unsaturation, for instance, polybutadiene or a styrene-butadiene rubber. These toughened grades of polystyrene can be made by mechanical mixing of the rubber and the polystyrene on a two roll mill or extruder. Common manufacturing techniques involve solution-graft polymerization processes although some special grades are made by blending polybutadiene latex or mechanical mixing with the polystyrene which can be made by the processes of mass, suspension, solution, ionic, or emulsion polymerization. The graft polymerization process starts with dissolving the rubber in styrene monomer, the rubber solution is then fed to the polymerization vessels. Generally the high impact polystyrene differs from the general purpose grades of polystyrene by the high impact polystyrene having lower stiffness, higher elongation, lower hardness, lower softening point, lower melt viscosity, lower gloss, higher opacity, and poorer chemical resistance.

In Table E is shown a comparison of the physical properties of various grades of high impact polystyrene when compounded with the fire retardant agent of Example 1 and antimony trioxide as compared to the high impact polystyrene uncompounded. It should be noted that the fire retardant blends are substantially the same in physical test properties as compared to the uncompounded grade and that by appropriate selection of the grade of high impact polystyrene it is possible to obtain both high impact strength and stiffness in the fire retardant polymer composition which would be comparable to the impact strength and stiffness obtainable with some general purpose grades of non-fire retardant acrylonitrile butadiene, styrene terpolymers which are substantially higher in cost.

ide until homogeneous. Flammability tests on compression molded samples by the ASTM-D-635 test procedure showed a self-extinguishing time of 1 second.

EXAMPLE 27

One hundred parts of a silicone rubber, 6 parts of Cab-O-Sil MS-7 and 1.5 parts of Luperco CST were mixed by milling with 10 parts of the fire retardant agent of Example 1 and 5 parts of antimony trioxide. Compression molded specimens when tested for flammability were found to burn.

TABLE E

PHYSICAL PROPERTIES OF FIRE RETARDANT HIGH IMPACT POLYSTYRENES

| | Composition, % by weight | Flammability self-extinguishing time (sec.) ASTM D-635 | Tensile Strength ASTM D-638-61T Yield (psi) | Tensile Strength ASTM D-638-61T Break (psi) | Elongation Yield (%) | Flexural strength ASTM D-790-63 Yield(psi) | Flexural strength ASTM D-790-63 Modulus(psi) | Impact strength ASTM D-256-56 Notched Izod. Average (ft. lbs./ in. of notch) |
|---|---|---|---|---|---|---|---|---|
| Example 21 | | | | | | | | |
| HIPS No. 21 | 83 | | | | | | | |
| Fire Retardant agent of Example 1 | 13 | 1.1 | 6175 | 5996 | 3.0 | 11,360 | $4.2 \times 10^5$ | 1.24 |
| Antimony trioxide | 4 | | | | | | | |
| Control for Example 21 | | | | | | | | |
| HIPS No. 21 | 100 | burns | 5921 | 5559 | 3.5 | 10,946 | $3.8 \times 10^5$ | 2.34 |
| Example 22 | | | | | | | | |
| HIPS No. 22 | 80 | | | | | | | |
| Fire Retardant agent of Example 1 | 15 | 1.3 | 4658 | 4517 | 3.1 | 8,047 | $3.6 \times 10^5$ | 1.96 |
| Antimony trioxide | 5 | | | | | | | |
| Control for Example 22 | | | | | | | | |
| HIPS No. 22 | 100 | burns | 4651 | 4169 | 3.1 | 8,149 | $3.3 \times 10^5$ | 3.72 |
| Example 23 | | | | | | | | |
| HIPS No. 23 | 83 | | | | | | | |
| Fire retardant agent of Example 1 | 13 | 1.0 | 3697 | 3718 | 4.4 | 6,907 | $3.1 \times 10^5$ | 2.09 |
| Antimony trioxide | 4 | | | | | | | |
| Control for Example 23 | | | | | | | | |
| HIPS No. 23 | 100 | burns | 3723 | 4134 | 4.7 | 6,652 | $2.8 \times 10^5$ | 2.68 |
| Example 24 | | | | | | | | |
| HIPS No. 24 | 83 | | | | | | | |
| Fire retardant agent of Example 1 | 13 | 2.7 | 5285 | 5168 | 4.2 | 10,279 | $3.9 \times 10^5$ | 1.86 |
| Antimony trioxide | 4 | | | | | | | |
| Control for Example 24 | | | | | | | | |
| HIPS No. 24 | 100 | burns | 5306 | 5332 | 4.0 | 9,990 | $3.6 \times 10^5$ | 2.50 |
| Example 25 | | | | | | | | |
| HIPS No. 25 | 83 | | | | | | | |
| Fire retardant agent of Example 1 | 13 | 2.0 | 3637 | 2885 | 3.5 | 6,271 | $2.6 \times 10^5$ | 6.94 |
| Antimony trioxide | 4 | | | | | | | |
| Control for Example 25 | | | | | | | | |
| HIPS No. 25 | 100 | burns | 3556 | 2901 | 3.7 | 5,984 | $2.5 \times 10^5$ | 8.84 |

Note
HIPS No. 21 is Dylene 808 made by Sinclair - Koppers Chemical Company
HIPS No. 22 is El Rexene 444 made by Rexall Chemical Company
HIPS No. 23 is Tufflex 329D made by Foster-Grant Chemical Co.
HIPS No. 24 is Tufflex 474 FP-9 made by Foster-Grant Chemical Co.
HIPS No. 25 is TMD2100 made by Union Carbide Chemical Co.

EXAMPLE 26

One hundred parts of a silicone rubber were blended by milling with 6 parts of Cab-O-Sil MS-7, 1.5 parts of Luperco CST and 20 parts of the fire retardant agent of Example 1 together with 10 parts of antimony triox-

EXAMPLE 28

One hundred parts of a silicon rubber was mixed by milling with 6 parts of Cab-O-Sil MS-7 and 1.5 parts of Luperco CST together with 20 parts of the fire retardant agent of Example 1. Flammability tests on compression molded samples by the ASTM-D-635 test procedure showed a self-extinguishing time of one second.

A comparison of the physical properties of Examples 26, 27, and 28 with a control made without the addition of any fire retardant additives is shown in Table F. It should be noted that the tensile strength of the polymer composition is reduced by the addition of fire retardant additives and that where the fire retardant agent of Example 1 is used alone as in Example 28 satisfactory fire retardant compositions can be obtained with minimal reduction in tensile strength.

ings according to the ASTM-D-635 test method showed a self-extinguishing time of 1.5 seconds with an afterglow of 5 seconds. On the alternate UL-94 flammability test method, the first self-extinguishing time was one second for a total of approximately 6.2 seconds with a pass on the test. In this example as indicated in all the previous examples, controls were run without the addition of flame retarding agent or antimony compound and it was found that the plastics were not self-extinguishing and that they would burn for a time greater than 45 seconds.

TABLE G

PHYSICAL PROPERTIES OF FLAME RETARDANT TERPOLYMERS OF POLYBUTADIENE, ACRYLONITRILE AND STYRENE

|  | Composition, % by weight | Flammability ASTM D-635 Self-extinguishing time (seconds) | Tensile Strength ASTM D-638-61T Yield (psi) | Tensile Strength ASTM D-638-61T Break (psi) | Elongation Yield (%) | Flexural strength ASTM D-790-63 Yield(psi) | Flexural strength ASTM D-790-63 Modulus(psi) | Impact strength ASTM D-256-56 Notched Izod. Average (ft. lbs./in. of notch) |
|---|---|---|---|---|---|---|---|---|
| Example 4 | | | | | | | | |
| ABS No. 4 | 83 | | | | | | | |
| Fire retardant agent of Example 1 | 13 | 1.7 | 5590 | 4520 | 4.5 | 9920 | $2.7 \times 10^5$ | 6.32 |
| Antimony trioxide | 4 | | | | | | | |
| Control for Example 4 | | | | | | | | |
| ABS No. 4 | 100 | burns | 5720 | 4610 | 4.2 | 9020 | $2.5 \times 10^5$ | 7.43 |
| Example 29 | | | | | | | | |
| ABS No. 29 | 83 | | | | | | | |
| Fire retardant agent of Example 1 | 13 | 1.5 | 6800 | 6240 | — | 10,460 | $3.1 \times 10^5$ | 2.56 |
| Antimony trioxide | 4 | | | | | | | |
| Control for Example 29 | | | | | | | | |
| ABS No. 29 | 100 | burns | 6280 | 5430 | 3.7 | 10,420 | $3.1 \times 10^5$ | 5.41 |

Note
ABS No. 4 is "Blendex 101" made by Marbon Chemical Division of Borg-Warner.
ABS No. 29 is "Kralastic MH" made by Uniroyal.

TABLE F

PHYSICAL PROPERTIES OF FIRE RETARDANT SILICONE RUBBER

| Example | 26 | 27 | 28 | Control |
|---|---|---|---|---|
| Composition By Weight | | | | |
| Silicone Rubber | 100.0 | 100.0 | 100.0 | 100.0 |
| Cab-O-Sil MS-7 | 6.0 | 6.0 | 6.0 | 6.0 |
| Luperco CST | 1.5 | 1.5 | 1.5 | 1.5 |
| Fire Retardant Additive of Example 1 | 20.0 | 10.0 | 20.0 | — |
| Antimony Trioxide | 10.0 | 5 | — | — |
| Flammability ASTM D-635 Self-extinguishing time (seconds) | 1.0 | burns | 1.0 | burns |
| Tensile Strength (psi) | 580 | 490 | 690 | 870 |
| Hardness (Durometer A) | 48 | 45 | 48 | 44 |

Note
Silicone rubber used was General Electric SE 404 made by the General Electric Company.
Cab-O-Sil MS-7 is silicon dioxide made by Cabot Corporation.
Luperco CST is 2-4 dichloro benzoyl peroxide made by the Lucidol Division of the Pennwalt Company.

EXAMPLE 29

Eighty-three parts of a terpolymer ("Kralastic MH" made by Uniroyal) of polybutadiene with acrylonitrile and styrene was blended with 13 parts of the fire retardant agent of Example 1, and 4 parts of antimony trioxide and mixed and extruded by the methods described in Example 1. Flammability tests on the resultant mold- Test samples from the foregoing examples containing the fire retardant agent of Example 1 were examined for efflorescence upon aging 2 to 7 days at room temperature. The results are tabulated in the Table below:

TABLE H

| Polymer | Amount of Efflorescence |
|---|---|
| Polyethylene Resin | None |
| Polypropylene Resin | None |
| Polystyrene Resin | None |
| Butadiene, Acrylonitrile, Styrene Resin | None |
| Styrene Butadiene Rubber | Light |
| Butyl Rubber | Moderate |
| General Purpose Polyester Resin | None |
| Epoxy Resin | None |
| Diallyl Phthalate Resin | None |
| Silicone Rubber | None |
| Impact Polystyrene Resin | None |

EXAMPLE 30

A composition was prepared by compounding 65 parts of a polyallomer (ethylene-polymer copolymer) sold under the tradename "Tenite 5B21," 23 parts of the flame retardant agent of Example 1, and 11.7 parts of antimony trioxide. Test speciments for use in evaluating fire retardance by the ASTM D-635 Test method were prepared by a procedure involving milling, molding, and machining in the following manner. Using a Stewart Bolling mill having rolls measuring 7 inches by 2 inches, the thermoplastic polymer was first banded on hot rolls at a temperature between 250° and 320° Fahrenheit, depending on the physical properties of the polymer, fire retardant additives were added, and the mix was sheeted and rebanded 12 times. Next, the polymer was molded into plaques measuring 6 inches by 6 inches by 0.075 inches, using a 36,000-pound ram pressure to close the mold, after a 2-minute warming period had elapsed in which only contact pressure was maintained. The molded plaque was cooled under pressure before removal from the mold. The mold temperature varied from between 250° to 340° Fahrenheit, depending on the physical properties of the polymer. Finally, specimens were machined from the molded plaques for evaluation according to the ASTM D-635 Test Method. Machined specimens measured 0.075 inches by 0.5 inches by 5 inches. Self-extinguishing time was determined to be 3.7 seconds using this test procedure. Alternately, the composition was tested according to ASTM D-2863 to determine oxygen index. The oxygen index is the minimum amount in percent of oxygen in a nitrogen-oxygen mixture which will just support combustion of the composition under test. The oxygen index of the composition was found to be 30.6. This compares with an oxygen index of 18 for the uncompounded "Tenite 5B21" polyallomer. Tensile strength for the compounded composition was 2190 pounds per square inch. Durometer A hardness was 96, and elongation at break was 10 percent. Test specimens were examined for efflorescence after storage between 2–7 days at room temperature and found to show a light surface coating.

EXAMPLE 31

A composition was made by compounding 100 parts of a polyvinyl chloride polymer sold under the tradename "Geon 103-EP," by the B F Goodrich Chemical Company, 50 parts of dioctyl phthalate, 5 parts of dibasic lead phosphite sold under the tradename "Dyphos," by the National Lead Company, 10 parts of the flame retardant agent of Example 1, and 5 parts of antimony trioxide to yield a composition which was tested for flame retardance by the ASTM D-1433-58 Test Method. Samples were prepared for testing following the procedure as outlined in Example 30. The sample took 0.5 seconds to burn 6 inches. Test samples showed light efflorescence after storage.

EXAMPLE 32

A composition was prepared by compounding 70 parts of polymethyl methacrylate sold under the tradename "Lucite" by the E I duPont de Nemours & Co., 20 parts of the flame retardant agent of Example 1, and 10 parts of antimony trioxide to yield a composition which was flame retardant when tested by the ASTM D-635 Test Method. The test samples were prepared following the procedures outlined in Example 30. The self-extinguishing time for the composition was 1.8 seconds.

EXAMPLE 33

A composition was prepared by compounding 65 parts of a high density polyethylene sold under the tradename "Tenite 3300" by the Tennessee Eastman Co., 23.3 parts of the flame retardant agent of Example 1, and 11.7 parts of antimony trioxide to yield a composition which was flame retardant by the ASTM D-635 Test Method. Test samples were prepared following the procedures outlined in Example 30. The self-extinguishing time for the composition was 2 seconds.

EXAMPLE 34

A composition was prepared by compounding 70 parts of a low density polyethylene sold under the tradename "Alathon 5B," by the E I duPont de Nemours & Co., 20 parts of the flame retardant agent of Example 1, and 10 parts of antimony trioxide. The composition was prepared for evaluation according to ASTM D-635 Test Method by following the procedures outlined in Example 30. The self-extinguishing time for the composition was 2.7 seconds. Test samples showed light efflorescence upon storage.

EXAMPLE 35

A composition was prepared by compounding and curing for 20 minutes at 320° Fahrenheit, 100 parts of a chlorinated polyethylene sold under the tradename of "CPE-500" by Allied Chemical Company, 40 parts of a processing oil sold under the tradename of "Philrich 5" by the Phillips Petroleum Company, 40 parts of a 40 percent chlorinated paraffin, sold under the tradename "CP-40" by the Industrial Chemical Division of the Hooker Chemical Corporation, 50 parts of carbon black, 5 parts of an epoxy resin sold under the tradename "Epon 828" by Shell Chemical Company, 7 parts of yellow lead oxide, 2 parts of stearic acid, 1 part of sulfur, 8 parts of 2-mercaptoimidazoline, sold under the tradename "NA-22" by E I DuPont de Nemours & Co., 10 parts of the flame retardant agent of Example 1, and 5 parts of antimony trioxide to yield a composition which after curing was flame retardant by the ASTM D-635 Test Method having a self-extinguishing time of 1 second. Samples were prepared for testing following the procedure as shown in Example 30. Test samples showed no efflorescence upon storage.

EXAMPLES 36 and 37

Compositions were prepared by compounding and curing for 30 minutes at 320° Fahrenheit 100 parts of a chlorosulfonated polyethylene sold under the tradename "Hypalon-40" by E I DuPont de Nemours & Co., 5 parts of wood rosin, 40 parts of yellow lead oxide sold under the tradename "Litharge" by the J T Baker Company, 3 parts of mercapto benzothiazole, 10 parts of the flame retardant agent of Example 1, and 5 parts of antimony trioxide to yield a composition which when cured was flame retardant by the ASTM D-635 Test Method having a self-extinguishing time of 1 second. An alternate composition was prepared eliminating antimony trioxide which after curing was flame retardant by the ASTM D-635 Test Method having a self-extinguishing time of 18.6 seconds. Samples were prepared for testing following the procedure outlined in Example 30. Ultimate tensile strength, percent elongation, and 300 percent modulus were determined in accordance with ASTM D-412-61-T and results were as follows. For the composition containing antimony trioxide, tensile strength was 5740 pounds per square inch, elongation at break was 590 percent, and 300 percent modulus was 1160 pounds per square inch.

The Durometer Hardness (Durometer A) was 70. For the composition containing no antimony trioxide, tensile strength was 5650 psi, elongation at break was 430 percent, and 300 percent modulus was 1890 psi. The Durometer Hardness (Durometer A) was 67. Test samples showed light efflorescence upon storage.

EXAMPLE 38

A composition was prepared following the procedures outlined in Example 30 using 90 parts of Nylon 66 and 10 parts of the flame retardant agent of Example 1 to produce a composition which was flame retardant by ASTM D-635 Test Method with a flame-out time of 12 seconds.

EXAMPLE 39

In this Example, and in the examples which follow, illustrating the use of the flame retardant agent of Example 1, in combination with elastomers, sample compositions were prepared for testing for flame retardance according to the standard ASTM D-635 Test Method and tensile strength in accordance with ASTM D-412-61-T according to the following procedure. The elastomer was first banded on a mill having 7 inch by 2 inch rolls (Stewart Bolling Mill). The rolls were heated up to 205° Fahrenheit to allow sufficient working of the elastomer. The elastomer was banded for approximately 2 minutes after which carbon black and processing oils were added over a period of 5 to 15 minutes. Subsequently, the non-black ingredients were added which include flame retardant additives over a period of 5 to 15 minutes. Curing agents were then added over a period of 2 minutes and the composition was sheeted and banded 12 times. The compounded composition was then molded using 60–80 grams of each elastomer mixture (depending upon mix density) in a mold having a 6 inches by 6 inches by 0.075 inch cavity using a 36,000 pound ram pressure to close the mold. Specimens were machined from the molded plaques to a dimension of 0.075 by 0.5 by 5 inches for testing according to the ASTM D-635 Test Method. Durometer Hardness values were obtained in accordance with ASTM D-676-59T and blooming was evaluated on the molded plaques by examining the surface after 2 to 7 days for the development of a white surface which was compared with standards in order to determine the degree of blooming.

A composition was prepared by compounding 100 parts of natural rubber, 25 parts of carbon black, 3 parts of zinc oxide, 2 parts of a rubber stabilizer sold under the tradename "Age Rite Resin D" by the R T Vanderbilt Co., 2 parts of sulfur, 2 parts of stearic acid, 0.8 parts of normal tertiary butyl 2-benzothiazole sulfenamide, sold under the tradename "Santocure" by the Monsanto Chemical Co., 30 parts of the flame retardant agent of Example 1, and 15 parts of antimony trioxide to yield a composition which when cured 40 minutes at 280° Fahrenheit was flame retardant by ASTM D-635 Test Method with a self-extinguishing time of 0–1 second. The tensile strength of the composition was 2660 pounds per square inch, elongation at break was 680 percent, 300 percent modulus was 710 psi and Durometer A Hardness was 50. Test samples showed heavy efflorescence upon storage.

EXAMPLE 40

A composition was prepared by compounding, molding and milling 100 parts of a polybutadiene rubber sold under the tradename "Ameripol CB880," by the B F Goodrich Chemical Co., 50 parts of carbon black, 3 parts of zinc oxide, 1.5 parts of normal cyclohexyl 2-benzothiazole sulfenamide, sold under the tradename "Santocure" by the Monsanto Chemical Co., 1.5 parts of sulfur, 30 parts of the flame retardant agent of Example 1, and 15 parts of antimony trioxide to yield a composition which when cured 30 minutes at 320° Fahrenheit was flame retardant by the ASTM D-635 Test Method having a self-extinguishing time of 2.3 seconds. The tensile strength of the composition was 1590 pounds per square inch, the elongation at break was 390 percent, the 300 percent modulus was 1130 pounds per square inch, and the Durometer A Hardness was 62. Test samples showed heavy efflorescence upon storage.

EXAMPLE 41

A composition was prepared by compounding, molding and milling in accordance with the procedure shown in Example 39, using 100 parts of nitrile butadiene rubber containing 30 percent acrylonitrile, sold under the tradename of "Hycar 1042," by the B F Goodrich Chemical Co., 40 parts of carbon black, 5 parts of zinc oxide, 3.5 parts of tetramethyl thiuram disulfide sold under the tradename "Tuex" by the Uniroyal Chemical Co., 1 part of stearic acid, 30 parts of the flame retardant agent of Example 1, and 15 parts of antimony trioxide. After curing the composition at 320° Fahrenheit for 30 minutes, samples were tested for flame retardant by the ASTM D-635 Test Method, and found to have a self-extinguishing time of between 0 and 1 second. Tensile strength of the composition was 2460 pounds per square inch, elongation at break was 730 percent, 300 percent modulus was 1130 pounds per square inch, and Durometer A Hardness was 70. Test samples showed moderate efflorescence upon storage.

EXAMPLE 42

A composition was prepared following the procedures outlined in Example 39 using 100 parts of an ethylene-propylene-diene modified rubber, sold under the tradename of "Vistalon 4608" by the Enjay Chemical Co., 75 parts of a fast-extruding furnace carbon black sold by the Witco Chemical Co., 150 parts of a medium thermal carbon black sold under the tradename "Thermax MT" by the R T Vanderbilt Co., Inc., 100 parts of a naphthenic type processing oil, sold under the tradename of "Flexon 580" by the Humble Oil & Refining Co., 3 parts of paraffin wax, 5 parts of zinc oxide, 1 part of stearic acid, 1.5 parts of sulfur, 4 parts of tetramethyl thiuram disulfide sold under the tradename of "Tuex" by the Uniroyal Chemical Co., 1.5 parts of 2-mercaptobenzothiazole, sold under the tradename "Captax" by the R T Vanderbilt Co., 30 parts of the flame retardant agent of Example 1, and 15 parts of antimony trioxide. After curing at 320° Fahrenheit for 30 minutes, the composition was evaluated according to the ASTM D- 635 Test Method and found to have a self-extinguishing time of 2.3 seconds. Tensile strength was 1330 pounds per square inch, elongation at break was 410 pounds per square inch, 300 percent modulus was 1070 pounds per square inch, and Durometer A Hardness was 58. Test samples showed moderate efflorescence upon storage.

EXAMPLE 43

A composition was prepared following the procedures outlined in Example 39 using 100 parts of a styrene butadiene block copolymer, sold under the tradename "Kraton 3200" by the Shell Chemical Corporation, 30 parts of the flame retardant agent of Example 1, and 10 parts antimony trioxide. The composition was cured 7 minutes at 320° Fahrenheit and evaluated for flame retardancy by the ASTM D-635 Test Method. The self-extinguishing time was 5 seconds. The tensile strength of the composition was 1780 pounds per square inch, the elongation at break was 850 percent, the 300 percent modulus was 350 pounds per square inch, and the Durometer A Hardness was 73. Test samples showed moderate efflorescence upon storage.

EXAMPLE 44

A composition was prepared following the procedures outlined in Example 39 using 100 parts of an isoprene rubber sold under the tradename "Natsyn 200" by the Goodyear Chemical Division of Goodyear Tire & Rubber Co., 25 parts of carbon black, 3 parts of zinc oxide, 2 parts of stearic acid, 1 part of a rubber stabilizer sold under the tradename "Age Rite Resin D" by the R T Vanderbilt Co., 2 parts of sulfur, 0.8 parts of normal tertiary butyl 2-benzothiazole sulfenamide sold under the tradename of "Santocure NS" by the Monsanto Chemical Co., 30 parts of the flame retardant agent of Example 1 and 15 parts of antimony trioxide. The composition was cured at 200° Fahrenheit for 40 minutes and evaluated for flame retardancy by the ASTM D-635 Test Method. The flame-out time was found to be 4 seconds. The tensile strength was 2930 pounds per square inch, the elongation at break was 670 percent, 300 percent modulus was 770 pounds per square inch, and the Durometer A Hardness was 50. Test samples showed light to moderate efflorescence upon storage.

EXAMPLE 45

A composition was prepared following the procedures outlined in Example 39 using 100 parts of an acrylic rubber sold under the tradename "Hycar 4021" by the Goodrich Chemical Co., 40 parts of carbon black, 1 part of stearic acid, 1.5 parts of triethylene tetramine, 2 parts of benzothiazole sulfide sold under the tradename "Altax" by the R T Vanderbilt Co., 10 parts of the flame retardant agent of Example 1 and 5 parts of antimony trioxide, to yield a composition which was flame retardant by the ASTM D-635 Test Method having a self-extinguishing time of 1.3 seconds. The composition was cured 30 minutes at 320° Fahrenheit before testing. Other test results are: Tensile strength — 1680 pounds per square inch; Elongation at break — 470 percent; 300 percent Modulus — 1150 pounds per square inch; and Durometer A Hardness — 60. Test samples showed no efflorescence upon storage.

EXAMPLE 46

A composition was prepared following the procedures outlined in Example 39 using 100 parts of a urethane rubber sold under the tradename "Genthane S," by the General Tire & Rubber Company, 25 parts of carbon black, 2 parts of stearic acid, 4 parts of dicumyl peroxide, 40 percent, sold under the tradename of "Di Cup 40C" by the Hercules Powder Co., 20 parts of the flame retardant agent of Example 1, and 10 parts of antimony trioxide to yield a composition which when cured at 320° Fahrenheit for 30 minutes was flame retardant by the ASTM D-635 Test Method having a self-extinguishing time of between 0 and 1 second. The tensile strength was 2520 pounds per square inch, the elongation at break was 910 percent, the 300 percent modulus was 590 pounds per square inch, and Durometer A Hardness was 56. Test samples showed moderate efflorescence upon storage.

EXAMPLE 47

A composition was prepared following the procedure as outlined in Example 39 using 100 parts of a polysulfide rubber sold under the tradename "Thiokol FA" by the Thiokol Corporation, 60 parts of carbon black, 10 parts of zinc oxide, 0.5 parts of stearic acid, 0.1 part of diphenyl guanidine, 0.3 parts of 2,2'-benzothiazyldisulfide, 40 parts of the flame retardant agent of Example 1 and 20 parts of antimony trioxide to yield a composition which was after curing 50 minutes at 300° Fahrenheit was flame retardant by the ASTM D-635 Test Method having a self-extinguishing time of 17 seconds. The tensile strength of the cured composition was 920 pounds per square inch, the elongation was 280 percent, and the Durometer A Hardness was 62. Test samples showed moderate efflorescence upon storage.

EXAMPLE 48

A composition was prepared according to the procedures described in Example 39 using 100 parts of a polychloroprene rubber sold under the tradename "Neoprene W" by E I DuPont de Nemours & Co., 60 parts of carbon black, 15 parts of a processing oil sold under the tradename "Circosol 4240" by the Sun Oil Co., 0.5 parts of stearic acid, 1 part of sulfur, 5 parts of zinc oxide, 4 parts of magnesium oxide, 1 part of 2,2'-benzothiazyl-disulfide, 0.5 part of 2-mercaptoimidazoline sold under the tradename "NA-22" by E I DuPont de Nemours & Co., 0.3 parts of tetramethyl thiuram monosulfide, and 10 parts of the flame retardant agent of Example 1. The self-extinguishing time for the composition after curing 320° Fahrenheit for 30 minutes was between 0 and 1 second, as determined by ASTM D-635 Test Method. The tensile strength for the composition was 2770 pounds per square inch, elongation at break was 270 percent, and Durometer A Hardness was 78. Test samples showed light to moderate efflorescence upon storage.

EXAMPLE 49

A composition was prepared following the procedures outlined in Example 30, by compounding 60 parts of an ethylene vinyl acetate copolymer sold under the tradename "Levapren 450," by Farben Fabriken-Bayer A.G. and 27 parts of the flame retardant agent of Example 1 to yield a composition which was tested for flame retardance by the ASTM D-635 Test Method. The self-extinguishing time for the composition was 8.7 seconds. Test samples showed no efflorescence after storage.

EXAMPLE 50

A composition was prepared by compounding, following the procedure as shown in Example 30, 60 parts of a styrene acrylonitrile polymer, sold under the tradename of "Tyril" by the Dow Chemical Corporation, 13 parts of antimony trioxide, and 27 parts of the flame retardant agent of Example 1 to yield a composition which was tested aaccording to ASTM D-2863 to determine oxygen index. The oxygen index was found to be 41.4. (The oxygen index of "Tyril" was found to be 18). Test samples showed no efflorescence upon storage.

EXAMPLE 51

A composition was prepared following the procedure shown in Example 30 by compounding 60 parts of a polyphenylene oxide/polystyrene, sold under the tradename of "Noryl" by the General Electric Corporation, 13 parts of antimony trioxide, and 27 parts of the flame retardant agent of Example 1. The oxygen index was tested according to ASTM D-2863 and found to be 43.5. (The oxygen index of "Noryl" was found to be 33.1). Test samples showed no efflorescence upon storage.

EXAMPLE 52

A composition was made following the procedures shown in Example 30 by compounding 60 parts of polycarbonate resin sold under the tradename of "Lexan" by the General Electric Corporation, 13 parts of antimony trioxide, and 27 parts of the flame retardant agent of Example 1. The composition was tested according to ASTM D-2863 for oxygen index. Test results show an oxygen index of 43.1 which compares to the oxygen index of the uncompounded "Lexan" of 28.5. Test samples showed no efflorescence upon storage.

EXAMPLE 53

A composition was prepared following the procedure as shown in Example 30 by compounding 60 parts of a polysulfone resin sold under the tradename of "Bakelite P-1700" by the Union Carbide Chemical Corporation, 13 parts of antimony trioxide, and 27 parts of the flame retardant agent of Example 1. The composition was tested according to ASTM D-2863 for oxygen index. Test results show an oxygen index of greater than 46. This compares with the oxygen index of the uncompounded polysulfone resin of 28.5. Test samples showed no efflorescence upon storage.

EXAMPLE 54

A phenolic molding compound sold under the tradename of "Durez 11864" by the Durez Division of Hooker Chemical Corporation, and comprised of a phenol-formaldehyde novolac resin, hexamethylene tetramine and fillers, was prepared for testing by following the procedure as shown in Example 30. The phenolic molding compound contained 30–40 percent of phenolic resin and was mineral filled.

EXAMPLE 55

A composition was prepared by compounding 60 parts of a polyvinyl acetal sold under the tradename "Delrin" by the E. I. DuPont de Nemours & Company with 27 parts of the flame retardant agent of Example 1, together with 13 parts of antimony trioxide. The composition was tested according to ASTM D-2863 for oxygen index. Test results show an oxygen index of 23.4. This compares with the oxygen index of the uncompounded "Delrin" of less than 16. It should be noted that 16 is the minimum oxygen index which can be measured using the test equipment.

Although specific examples of the invention have been set forth hereinbefore, it is not intended to limit the invention thereto but to include the variations and modifications of the invention.

What is claimed is:

1. A fire retardant polymer composition comprising a polymer selected from the group consisting of thermoplastic and thermosetting polymers and elastomers and an effective fire retardant proportion of a compound of the formula:

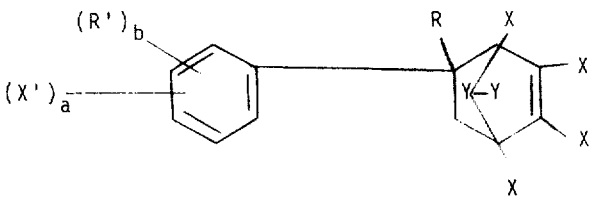

wherein X is a halogen selected from the group consisting of fluorine, chlorine, bromine and mixtures thereof; Y is a substituent selected from the group consisting of chlorine, bromine and fluorine, alkyl of 1 to 10 carbon atoms, halogen substituted alkyl of 1 to 10 carbon atoms, alkoxy of 1 to 10 atoms, and halogen substituted alkoxy of 1 to 10 carbon atoms, wherein the halogen is chlorine, fluorine or bromine; X' is a halogen independently selected from the group consisting of chlorine, bromine and mixtures thereof; R and R' are independently selected from the group consisting of hydrogen, alkyl of 1 to 6 carbon atoms and halogen substituted alkyl of 1 to 6 carbon atoms wherein said halogen is selected from the group consisting of fluorine, chlorine and bromine; $a$ is from about 4 to 5, $b$ is 0 to about 1, and $a + b$ is 5.

2. The fire retardant polymer composition of claim 1 wherein X and Y are chlorine, and R and R' are hydrogen.

3. The fire retardant polymer composition of claim 2 wherein X' is bromine and $a$ is an average of about 4.

4. The fire retardant polymer composition of claim 2 wherein X' is chlorine and $a$ is an average of about 4.

5. The fire retardant polymer composition of claim 2 wherein X' is bromine and $a$ is 5.

6. The fire retardant polymer composition of claim 1 which comprises from about 5 to about 40 percent by weight of the compound of said formula and from about 1 to about 30 percent by weight of an antimony compound, based on the weight of the polymer composition.

7. The fire retardant polymer composition of claim 2 which comprises from about 10 to about 35 percent by weight of the compound of said formula and from about 2 to about 25 percent by weight of antimony trioxide, based on the weight of the polymer composition.

8. The fire retardant polymer composition of claim 1 wherein the thermoplastic polymer is selected from the group consisting of polymers of unsaturated hydrocarbons, polycarbonates, polysulfones, polyphenylene oxides, vinyl polymers, polymers of acrylate esters, polyamides, chlorinated polyethylene, and chlorosulfonated polyethylene.

9. The fire retardant polymer composition of claim 8 wherein the thermoplastic polymer is polyethylene.

10. The fire retardant polymer composition of claim 8 wherein the thermoplastic polymer is polypropylene.

11. The fire retardant polymer composition of claim 8 wherein the thermoplastic polymer is polystyrene.

12. The fire retardant polymer composition of claim 8 wherein the thermoplastic polymer is a terpolymer of polybutadiene, styrene and acrylonitrile.

13. The fire retardant polymer composition of claim 8 wherein the thermoplastic polymer is nylon.

14. The fire retardant polymer composition according to claim 8 wherein the thermoplastic polymer is selected from the group consisting of mixtures of polybutadiene and polystyrene, and copolymers of polybutadiene and sytrene.

15. The polymer of claim 14 wherein the mixtures of copolymers of polybutadiene and styrene contain between 10 and 40 percent by volume of polybutadiene.

16. The fire retardant polymer composition of claim 8 wherein the thermoplastic polymer is polyvinyl chloride.

17. The fire retardant polymer composition of claim 8 wherein the thermoplastic polymer is ethylene-propylene copolymer.

18. The fire retardant polymer composition of claim 8 wherein the thermoplastic polymer is polymethyl methacrylate.

19. The fire retardant polymer composition of claim 8 wherein the thermoplastic polymer is styrene acrylonitrile copolymer.

20. The fire retardant polymer composition of claim 8 wherein the thermoplastic polymer is ethylene vinyl acetate copolymer.

21. The fire retardant polymer composition of claim 1 wherein the thermosetting polymer is selected from the group consisting of phenolic resins, epoxy resins, unsaturated polyester resins, and polymers of diallyl phthalate.

22. The fire retardant polymer composition of claim 21 wherein the thermosetting polymer is a phenol formaldehyde resin.

23. A fire retardant polymer composition according to claim 1 wherein the elastomer is selected from the group consisting of silicone rubber, natural rubber, polybutadiene rubber, nitrile butadiene rubber, sytrene butadiene rubber, acrylic rubber, urethane rubber, isoprene rubber, polychloroprene rubber, polysulfide rubber, butyl rubber, styrene butadiene block copolymer rubber, and ethylene-propylene-diene modified rubber.

24. A fire retardant polymer composition comprising a thermoplastic polymer consisting of a terpolymer of polybutadiene, acrylonitrile and styrene and an effective fire retardant proportion of a compound of the formula:

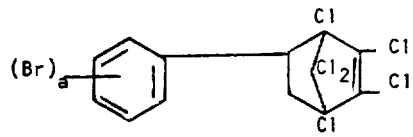

wherein $a$ is an average of about 4 and from about 2 percent to about 25 percent by weight of the polymer composition of antimony trioxide.

25. The composition of claim 1 wherein X' is a mixture of bromine and chlorine.

26. The composition of claim 25 wherein X and Y are chlorine and wherein from about 2 percent to about 25 percent by weight of the polymer composition is antimony trioxide.

27. The composition of claim 25 wherein from about 10 to about 20 percent by weight of said compound contains three bromine atoms and one chlorine atom substituted on the benzene ring and from about 90 to about 80 percent by weight of said compound contains four bromine atoms substituted on the benzene ring.

* * * * *